Patented Nov. 28, 1933

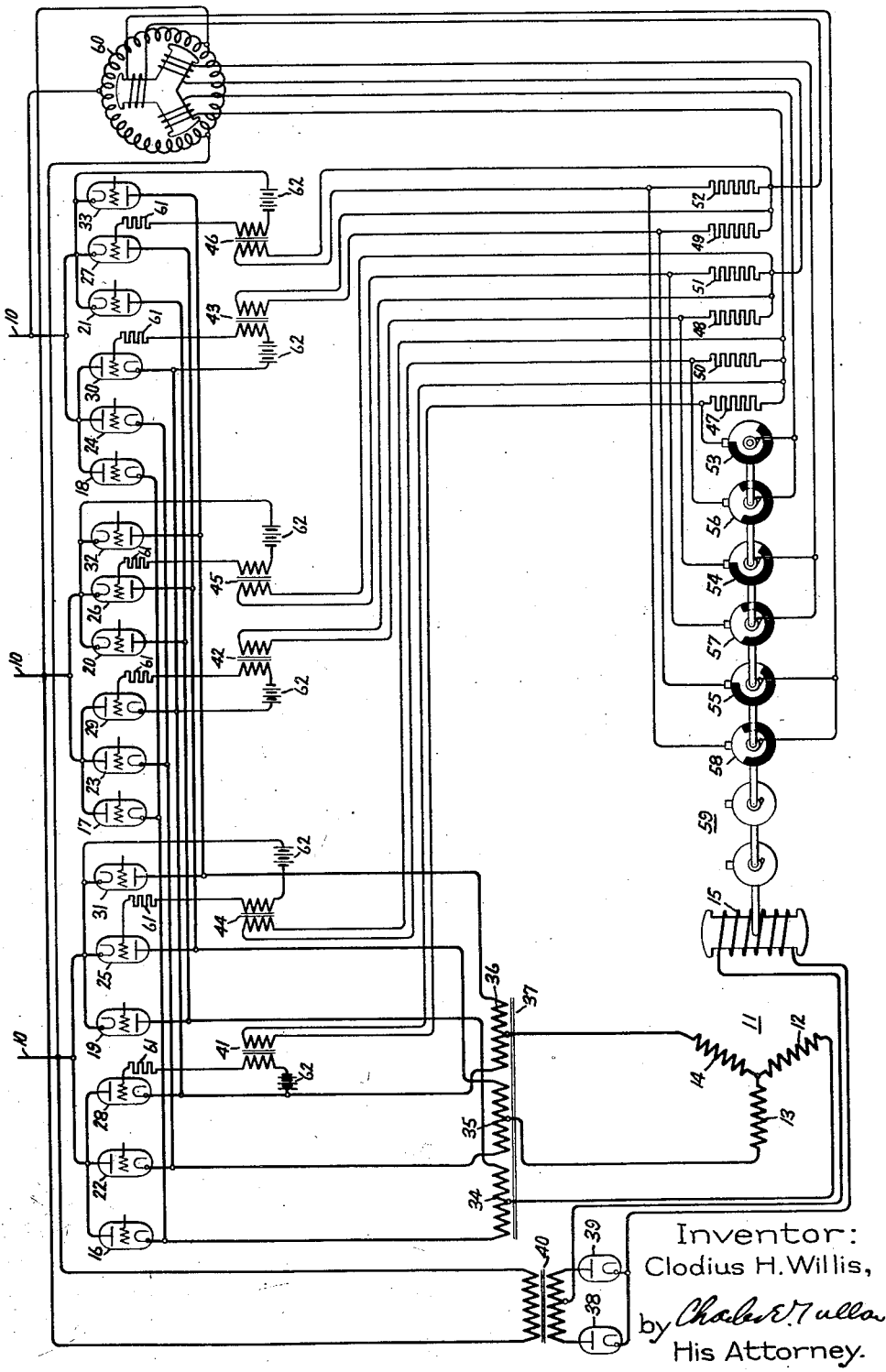

1,937,372

UNITED STATES PATENT OFFICE 1,937,372

ELECTRIC VALVE CONVERTING SYSTEM

Clodius H. Willis, Princeton, N. J., assignor to General Electric Company, a corporation of New York Application May 27, 1932, Serial No. 613,891
Renewed August 18, 1933

4 Claims. (Cl. 172—281)

My invention relates to electric valve converting systems and more particularly to such systems adapted to transmit energy between independent alternating current circuits of the same or different frequencies.

Heretofore, there have been proposed numerous arrangements including electric valves for transmitting energy between alternating current circuits of the same or different frequencies. Certain of these arrangements of the prior art have been subject to the disadvantage that the failure of an electric valve would tend to cause a short circuit on one or both of the alternating current circuits. Certain other of the arrangements of the prior art have overcome the above disadvantage at the expense of one or more insulation transformers or reactors for separating certain portions of the circuits in which short-circuit currents might occur.

It is an object of my invention to provide an improved electric valve converting system which will overcome the above mentioned disadvantages of the arrangements of the prior art, and which will be simple and reliable in operation.

It is another object of my invention to provide an improved electric valve converting system for transmitting energy between alternating current circuits of the same or different frequencies in which short circuit currents occasioned by the failure of an electric valve may be substantially eliminated.

In accordance with one embodiment of my invention, a polyphase alternating-current supply circuit is connected to supply a variable frequency alternating-current circuit, such for example, as a variable frequency alternating-current motor, through an electric valve frequency changer. The frequency changer comprises two groups of oppositely connected electric valves interconnecting each phase of the load circuit with the several terminals of the supply circuit. Interposed in the connections between the groups of each pair is an inductive winding provided with an electrical midpoint connected to one phase of the load crcuit. The several inductive windings are mounted on a single-phase magnetic core structure to form a reactance device so connected in the system that any short-circuit current between the several lines of the supply circuit will be opposed by the full magnetizing impedance of the reactance device, and thus limited to a negligible value. This reactance device also serves to smooth the high frequency ripple voltage of the supply circuit.

For a better understanding of my invention, together with other and further objects thereof, reference is had to the following description taken in connection with the accompanying drawing and its scope will be pointed out in the appended claims. The single figure of the accompanying drawing illustrates an arrangement embodying my invention for transmitting energy from a three-phase alternating-current supply circuit to a three-phase synchronous dynamo-electric machine adapted to operate at a variable frequency.

Referring now to the drawing, there is illustrated an electric valve converting system embodying my invention for transmitting energy from a three-phase alternating-current supply circuit 10 to a three-phase alternating-current load circuit, which, by way of example, is illustrated as a three-phase synchronous dynamo-electric machine 11 adapted to operate at a variable frequency. The synchronous machine 11 comprises phase windings 12, 13, and 14 and a rotary field or exciting winding 15. The phase winding 12 is connected to receive energy from the several lines of the supply circuit 10 through a group of electric valves 16, 17 and 18 and to return current to the circuit 10 through a group of electric valves 19, 20 and 21, connected oppositely to the first group of valves. Interposed between the groups 16—17—18 and 19—20—21 is an inductive winding 34 provided with an electrical midpoint connected to the phase winding 12. Similarly, the phase winding 13 is connected to the circuit 10 through the inductive winding 35 and the groups of electric valves 22—23—24 and 25—26—27 and the phase winding 14 through the inductive winding 36 and the groups of valves 28—29—30 and 31—32—33. The inductive windings 34, 35 and 36 are mounted on a single magnetic core and comprise a single-phase reactance device. The electric valves 16-33, inclusive, are each provided with an anode, a cathode and a control grid and may be of any of the several types well known in the art, although I prefer to use valves of the vapor electric discharge type. The exciting winding 15 of the synchronous machine 11 may be excited from any suitable source of unidirectional current though I have illustrated, by way of example, a rectifier comprising electric valves 38 and 39 and a transformer 40 energized from one phase of the supply circuit 10 and connected with the valves in a conventional manner to secure full wave rectification.

In order to control the conductivities of the several electric valves that supply current successively to the several phase windings of the synchronous machine 11, the grids of the several groups of electric valves are adapted to be selectively excited through a distributor 59 with an alternating potential of the frequency of the supply circuit 10. For example, the grids of the group of valves 28—29—30 are energized through their respective grid transformers 41—42—43 with the potentials across resistors 47—48—49. Each of these resistors is energized with an alternating potential of substantially the same phase as that of the line of the supply circuit 10 to which their associated electric valves are connected, through the segments 53, 54 and 55, respectively, of the distributor 59, mechanically driven from the synchronous machine 11. Similarly, the grids of the group of valves 25—26—27 connected to the phase winding 13 are energized through their respective grid transformers 44—45—46 with the potentials across resistors 50, 51 and 52, which are similarly energized through the sections 56, 57 and 58, of the distributor 59. If desired, some phase shifting arrangement, such for example as a rotary phase shifting transformer 60, may be interposed between the supply circuit 10 and the several resistors 47–52, inclusive, which furnish the source of grid excitation. The grid circuits of each of the groups of valves 28—29—30 and 25—26—27 preferably include current limiting resistors 61 and negative bias batteries 62.

For the sake of simplicity, there has been shown only the grid circuits for those valves adapted to supply current to the synchronous machine 11 for a particular portion of its cycle of operation; that is, for those valves which supply current to the phase windings of the machine 11 which are in torque producing position with respect to the rotor as illustrated in the figure. It will be apparent to those skilled in the art that the grids of the several other electric valves will be excited in a manner similar to that just described. However, the feature of energizing a synchronous dynamo-electric machine as described above and the particular arrangement for controlling the grids of the several electric valves, form no part of my present invention but are disclosed and broadly claimed in my copending application, Serial No. 598,518, filed March 12, 1932, and in the copending applications of E. F. W. Alexanderson, Serial No. 638,361, filed May 11, 1923, and Serial No. 598,380, filed March 12, 1932, all assigned to the same assignee as the present application.

In explaining the operation of the above described apparatus, it will be assumed that the field member 15 of the machine 11 and the associated distributor 59 are in the positions illustrated, and that the rotary phase shifting transformer is so adjusted that the grid potentials impressed upon the several electric valves are substantially in phase with the potentials of the phase of the circuit 10 to which they are connected. Under these conditions, the grids of the groups of valves 28—29—30 and 25—26—27 will be excited with an alternating potential substantially in phase with their respective anode potentials and of sufficient magnitude to overcome the negative bias of the batteries 62. These two groups of valves together with the phase windings 14 and 13 of the synchronous machine 11 comprise a full wave rectifier circuit in which the phase windings 14 and 13 constitute a unidirectional load circuit, current flowing from the alternating-current circuit 10 into the phase winding 14 through the phase winding 13 and being returned to the circuit 10. The phase windings 14 and 13 are in a torque producing position with respect to the field member 15 with the result that the motor 11 tends to rotate in a counter-clockwise direction. When it has moved through substantially 60 electrical degrees, the energizing circuit for resistors 50, 51 and 52 will be broken at the sections 56, 57 and 58, respectively, and the grid transformers 44, 45 and 46 will be deenergized so that the negative bias batteries in the grid circuits of the group of valves 25—26—27 will render these valves non-conductive. At the same time the group of valves 19—20—21 will be rendered conductive by their respective grid transformers and grid control circuits (not shown) in a manner similar to that described above and the resultant magneto-motive force of the machine 11 will be advanced through 60 electrical degrees so that the field member 15 is again in approximately maximum torque producing position. In this manner the current is successively transferred between the phase windings 12, 13 and 14 of the motor 11 and the motor will tend to come up to speed. It will be noted that the distributor 59 cooperates with the field member 15 to render conductive only those groups of valves which supply current to a phase winding in torque producing position. As will be well understood by those skilled in the art, if it is desired to reduce the applied voltage under starting conditions, this result may be secured by retarding the phase of the alternating potential supplied to the grids of the several electric valves by means of the rotary phase shifting transformer 60.

Under the conditions first assumed above, it will be noted that the current is flowing into the phase winding 14 through the left hand portion of the inductive winding 36 and returning to the circuit 10 through the phase winding 13 and the right-hand portion of the inductive winding 35. The magnetomotive forces of the portions of these two windings acting on the common magnetic core member 37 tend to neutralize each other so that the only reactance of this circuit external to the motor itself is the leakage reactance of these windings. However, the full reactance of these windings is effective to smooth the high frequency ripple voltage of the supply circuit 10. If the control circuit of one of the electric valves, for example the valve 28, should fail so that this valve should become conductive at the same time as the group of valves 31—32—33 are made conductive, these latter valves serving to return the current to the alternating-current circuit 10, it will be seen that the circuit 10 tends to become short circuited through electric valve 28, inductive winding 36, and electric valves 32 and 33. If the winding 36 were omitted it would be seen that a direct short circuit would result on the alternating current circuit 10. Under the assumed conditions, however, such short-circuit current flowing through the winding 36 would not be neutralized by an equal and opposite magnetomotive force in any of the other windings, but only that portion thereof corresponding to the load current flowing through the right-hand portion of the winding 36. Such short-circuit current would, therefore, tend to increase the magnetization of the reactance device comprising the core 37 and the windings 34, 35 and 36 and is thus opposed by the full magnetizing impedance of this device. By means of this reactance device the short-circuit current may be limited to any desired value without disturbing the operation of the rest of the apparatus as a whole.

While I have illustrated my invention as applied to an arrangement for transmitting energy from an alternating-current supply circuit to a synchronous dynamo-electric machine, it will be obvious to those skilled in the art that the armature winding of the motor 11 may comprise any suitable polyphase load circuit, such for example, as the primary winding of an output transformer, in which case the grids of the several electric valves may be energized directly from the output circuit or from an auxiliary pilot generator driven to supply a frequency at which it is desired to energize the load circuit. Also it will be understood that my invention is not limited to the transmission of energy between two three-phase alternating-current circuits, but is equally applicable for energizing any polyphase alternating-current load circuit from an alternating-current supply circuit of any number of phases.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In an electric valve converting system, the combination of a pair of alternating-current circuits of different frequencies, one of said circuits being a polyphase circuit, a plurality of groups of electric valves interconnecting said circuits, means for successively rendering conductive said groups of valves to transmit energy between said circuits, and means for minimizing fault currents occasioned by the failure of an electric valve comprising a reactance device interconnecting the groups of valves connected to each phase of said polyphase circuit, and a magnetic core member coupling all of said reactance devices.

2. In an electric valve converting system, the combination of a pair of alternating-current circuits of different frequencies, one of said circuits being a polyphase circuit, a pair of oppositely connected groups of electric valves for each phase of said polyphase circuit, said valves interconnecting said circuits, means for successively rendering conductive said groups of valves to transmit energy between said circuits, and means for limiting fault currents occasioned by the failure of an electric valve comprising a reactance device provided with an electrical midpoint interposed in the connections of each phase of its associated pair of groups of valves, the electrical midpoints being connected to the polyphase circuit, and a magnetic core member inductively coupling said reactance devices.

3. In an electric valve converting system, the combination of a pair of alternating-current circuits of different frequencies, one of said circuits being a polyphase circuit, a pair of oppositely connected groups of electric valves for each phase of said polyphase circuit, said valves interconnecting said circuits, means for successively rendering conductive said groups of valves to transmit energy between said circuits, and means for limiting fault currents occasioned by the failure of an electric valve comprising a single phase reactance device having an inductive winding for each phase of said polyphase circuit, each of said windings being provided with an electrical midpoint connected to its respective phase of the polyphase circuit and end terminals each connected to one of the associated groups of valves.

4. In an electric valve converting system, the combination of an alternating-current supply circuit, a polyphase alternating-current load circuit, a pair of oppositely connected groups of electric valves interconnecting each phase of said load circuit with said supply circuit, means for successively rendering conductive said groups of valves to transmit energy between said circuits, and a single-phase reactance device having an inductive winding interconnecting the groups of valves of each pair, each of said inductive windings being provided with an electrical midpoint connected to one phase of said load circuit.

CLODIUS H. WILLIS.